United States Patent
Akpinar et al.

(10) Patent No.: US 10,324,197 B1
(45) Date of Patent: Jun. 18, 2019

(54) SYSTEMS AND METHODS FOR ESTIMATING INITIAL HEADING AT START-UP OF NAVIGATION

(71) Applicant: Pointr Limited, London (GB)

(72) Inventors: Ismail Ege Akpinar, London (GB); Sinan Isik, Istanbul (TR); Can Tunca, Istanbul (TR); Mehmet Can Akpinar, Istanbul (TR)

(73) Assignee: Pointr Limited, London (GB)

( * ) Notice: Subject to any disclaimer, the term of this patent is extended or adjusted under 35 U.S.C. 154(b) by 0 days.

(21) Appl. No.: 16/189,520

(22) Filed: Nov. 13, 2018

(51) Int. Cl.
G01S 19/49 (2010.01)
G01S 19/53 (2010.01)
G01C 21/16 (2006.01)

(52) U.S. Cl.
CPC ............ G01S 19/49 (2013.01); G01C 21/165 (2013.01); G01S 19/53 (2013.01)

(58) Field of Classification Search
CPC .... G01C 21/206; G01C 21/16; G01C 25/005; G01C 21/10
See application file for complete search history.

(56) References Cited

U.S. PATENT DOCUMENTS

| 8,649,930 | B2 * | 2/2014 | Reeve | A01B 69/008 |
| | | | | 701/23 |
| 2007/0250261 | A1 * | 10/2007 | Soehren | G01C 21/16 |
| | | | | 701/510 |
| 2009/0254276 | A1 * | 10/2009 | Faulkner | G01C 21/16 |
| | | | | 701/469 |
| 2013/0311134 | A1 * | 11/2013 | Kordari | G01C 22/006 |
| | | | | 702/160 |
| 2014/0288822 | A1 * | 9/2014 | Morrison | G01S 19/23 |
| | | | | 701/466 |
| 2015/0350849 | A1 * | 12/2015 | Huang | H04W 4/04 |
| | | | | 455/456.1 |
| 2016/0069690 | A1 * | 3/2016 | Li | G01C 21/206 |
| | | | | 701/412 |

OTHER PUBLICATIONS

Xiaoli Meng et al., Self-Contained Pedestrian Tracking During Normal Walking Using an Inertial/Magnetic Sensor Module, Mar. 2014, IEEE Transactions on Biomedical Engineering, vol. 61, No. 3, pp. 892-899. (Year: 2014).*

Rommanee Jirawimut et al., A Method for Dead Reckoning Parameter Correction in Pedestrian Navigation System, Feb. 2003, IEEE Transactions on Instrumentation and Measurement, vol. 52, No. 1, pp. 209-215 (Year: 2003).*

Feyissa Woyano et al., Evaluation and Comparison of Performance Analysis of Indoor Inertial Navigation System Based on Foot Mounted IMU, Jan. 31, 2016, ICACT2016, ISBN 978-89-968650-6-3, pp. 1 (Year: 2016).*

* cited by examiner

*Primary Examiner* — Mischita L Henson
(74) *Attorney, Agent, or Firm* — Dickinson Wright PLLC; Mark E. Scott

(57) ABSTRACT

Estimating initial heading at start-up of navigation. At least some of the example embodiments are computer-implemented methods including: spawning a plurality of clone processes, each clone process given an identical location and speed, and each clone process given a unique direction; calculating, by each clone process, a respective position at the end of a frame period; terminating clone processes whose position at the end of the frame period is outside a predetermined threshold, the terminating results in remaining clone processes; and determining the heading of the mobile device from the remaining clone processes.

25 Claims, 9 Drawing Sheets

SYSTEMS AND METHODS FOR ESTIMATING INITIAL HEADING AT START-UP OF NAVIGATION

CROSS-REFERENCE TO RELATED APPLICATIONS

Not Applicable.

BACKGROUND

Navigation systems designed for vehicles use global positioning system (GPS) signals to find position and find a route to a destination. GPS-based systems are usually deployed in vehicles where main power supply is not restricted. Further, finding initial heading in these systems is not designed to be quick. As a vehicle may move slowly at the beginning of the journey, the delay in finding initial heading may not present a major problem.

However when navigation is needed for a pedestrian many things change. Firstly, walking is at a steady speed at the beginning and along the journey. Secondly, pedestrians use mobile devices that have restricted power supply. Thirdly, the pedestrian may need the most help when starting the journey. The pedestrian will be disappointed if told to initially head South, and a minute later told to head West. Most if not all related-art systems defer initial direction computation until the user moves in one direction so that data can be collected to determine the initial heading; however, by the time the initial heading is determined the user may already be headed in the wrong direction.

Whether in vehicles or mobile devices, GPS-based systems may take three to seven minutes to determine an initial heading, particularly if the GPS-based system has been moved to a new location since its last GPS-based position determination. Similarly, mobile devices determining position based on location information provided by beacon devices may take a minute or more to determine initial heading.

Systems and methods that reduce the amount of time needed to determine initial heading would provide a competitive advantage in the marketplace.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application specific integrated circuit (ASIC), a microcontroller with controlling software, a digital signal processor (DSP), a processor with controlling software on memory, a field programmable gate array (FPGA), or combinations thereof, configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

It is noted that the various embodiments were developed in the context of determining initial heading in indoor navigation circumstances, and thus the description is based on the developmental context; however, indoor navigation is merely an example of a situation where an initial heading determination may be made, and other uses are possible (e.g., outdoor navigation, outdoor pedestrian navigation, GPS-based automobile navigation, and aviation navigation). Thus, the developmental context shall not be read a limitation of the various embodiments. The specification now turns to an example environment to help orient the reader.

Figure 1:
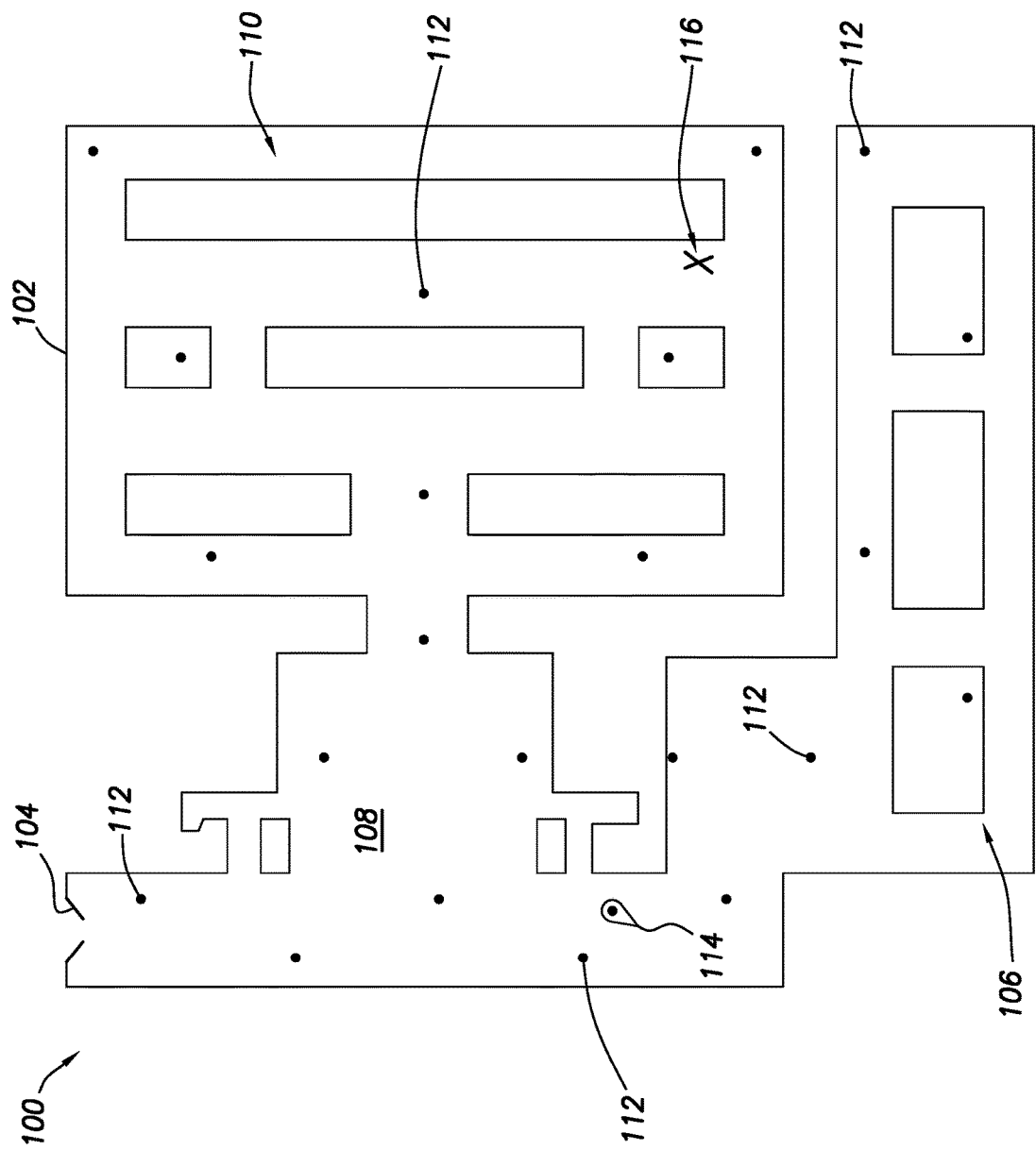
FIG. 1 shows an overhead view of an indoor venue in accordance with at least some embodiments.

FIG. 1 shows an overhead view of an indoor venue in accordance with at least some embodiments. In particular, FIG. 1 shows the layout 100 of an example indoor venue 102. A person may enter the indoor venue 102 through doors 104. Once inside, the person may want to navigate from the entry hall area 108 to the exhibition area 106 or exhibition area 110. Disposed within the indoor venue are a plurality of beacon devices 112. Not all beacon devices are numbered so as not to unduly complicate the figure. The beacon devices 112 may be placed at any suitable location, such as ceiling-mounted beacon devices, wall-mounted beacon devices, beacon devices mounted on structural pillars, and the like. The beacon devices 112 may take any suitable form, such as Bluetooth Low Energy (BLE) devices, or Ultra Wide Band (UWB) devices, available from many manufacturers. Moreover, location determinations may take any suitable form, such as triangulation, received signal strength indications (RSSI), and combinations. The various embodiments of determining initial heading may be used with any suitable location determination method and system.

Consider that user has entered the facility, is standing at location 114 in the entry hall 108, and would like to navigate to location 116 within exhibit hall 110. The hand-held computing device or mobile device carried by the user has a navigation program that either knows in advance, or is provided upon request from the beacon devices 112 or a cellular data network, the layout of the indoor venue 102. While the mobile device may know its initial location 114, the initial heading may not be known or there may be more than one viable solution based on the accuracy of the location data available at the time. If the navigation program makes an incorrect assumption about direction to travel from location 114, the user may travel a significant distance in the wrong direction (in the example, into exhibit hall 106), before being given a correct heading to reach location 116 in exhibit hall 110.

In related-art systems, the navigation platform may take several minutes to determine the initial heading, in which case the user may be walking in the wrong direction (e.g., towards exhibit hall 106 rather than exhibit hall 110 in this example) before the navigation platform can resolve an initial heading. While most related-art systems focus on increasing accuracy of triangulation methods, none of the related-art systems have paid sufficient attention to reducing the time required to compute the initial heading. Nor have the related-art systems paid attention to increasing the accuracy of initial heading so that the user is directed correctly as soon as navigation program starts. Some related-art systems use particle filters for navigation algorithms, particularly in robots, vehicles, and other types of machines. For such related-art navigation platforms to work accurately and responsively, the navigation platforms need to generate, maintain, and follow in excess of 10,000 particle filters. Maintaining and harvesting data from 10,000 particle filters consumes significant power resources, making such methods unsuitable for mobile devices. For this reason alone, use of particle filters is not viable on mobile devices. Another important point to consider is that particle filters perform well in estimating position, but not heading or heading change. Walking users are more likely to change heading suddenly than vehicles. Therefore, if the user changes heading suddenly, particle filters would take significant time to realize the change in heading. Another major disadvantage of particle filter systems is that the process is stochastic and not deterministic. Feeding the same data to a stochastic process may yield different results each time. This is totally unacceptable for pedestrians.

By contrast, example embodiments are directed to systems and methods for estimating initial direction at start-up of navigation. More particularly, example embodiments are directed to determining initial heading of a mobile device by not assuming any initial heading; rather, example methods spawn a plurality of clone processes that are initially given identical locations and identical speeds, and with each clone process assigned or given a unique direction. The clone processes, in some cases Kalman filters, and in a particular case extended Kalman filters, each calculate a respective position after a frame period. In some cases, each clone process performs multiple location calculations during the frame period by being provided speed heading change information multiple times during the frame period. Eventually the mobile device determines a new position indication (likely with higher accuracy than the first position indication) that too is passed to the clone processes. Each clone process calculates metrics related to the respective position and the actual position, and clone processes whose assigned directions are sufficiently different than the actual direction of travel are terminated, resulting in remaining clone processes. When the remaining clone processes sufficiently agree, an initial heading is thus established. In example embodiments the initial heading is determined in two seconds or less, and in some cases one second or less.

Mobile devices and computer systems, prior to the innovations described herein, were unable to resolve initial heading quickly enough to be useful for deriving initial navigation directions, many times resulting in navigation platforms providing incorrect navigation directions that many times were not corrected for five minutes or more. The improvements discussed herein thus improve the operation of the computer systems and mobile devices. Moreover, improvements discussed herein improve another technological field of computer-assisted navigation. The specification now turns to an example mobile device which may implement the various embodiments.

Figure 2:
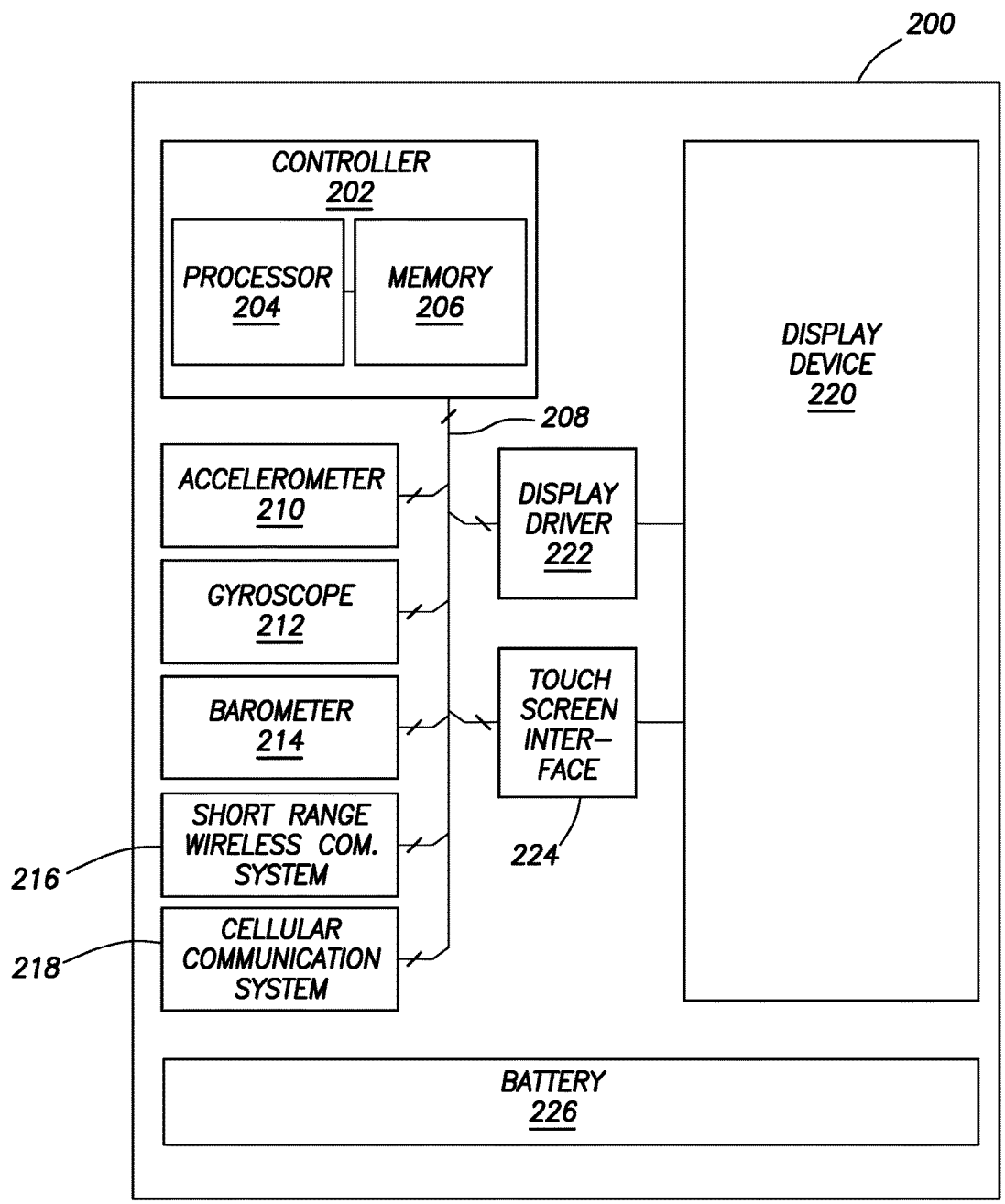
FIG. 2 shows a block diagram of a mobile device in accordance with at least some embodiments.

FIG. 2 shows a block diagram of a mobile device in accordance with at least some embodiments. In particular, FIG. 2 shows example mobile device 200 comprising a controller 202. The controller 202 takes any suitable form, such as an application specific integrated circuit (ASIC), a microcontroller with controlling software, a digital signal processor (DSP), a processor with controlling software, a field programmable gate array (FPGA), or combinations thereof, configured to read inputs and drive outputs responsive to the inputs. In the system of FIG. 2, the controller 202 is implemented in the example form of a processor 204 coupled to a memory 206. The controller 202 couples to host of internal components and devices by any suitable direct connection or bus system, as shown by the example internal bus 208.

The example mobile device 200 comprises an accelerometer 210 electrically coupled to the controller 202 by way of the internal bus 208. The accelerometer 210 may take any suitable form, such as a single-axis accelerometer, or multi-axis accelerometer. In a particular example, the accelerometer 210 is a three-axis accelerometer such that the mobile device 200 may be able to determine acceleration in any dimension (e.g., movement in the horizontal plane along with how much the user "bounces" for each step taken). In other cases the accelerometer 210 may be one or more velocity meters, from which acceleration can be mathematically determined.

The example mobile device 200 further comprises an electronic gyroscope 212 electrically coupled to the controller 202 by way of the example internal bus 208. The gyroscope 212, standing alone, may not be able to provide a heading relative to a coordinate system (e.g., relative to magnetic North) unless the data from the gyroscope 212 is combined with other data. However, the gyroscope 212 can be used to create accurate indications of heading change even when the absolute heading is not known.

The example mobile device 200 further comprises a barometer 214 electrically coupled to the controller 202 by way of the example internal bus 208. The barometer 214 may be used to read barometric pressure, which is indicative of the elevation. Of course, barometric pressure is also influenced by high and low pressure weather patterns; however, frequent readings of the barometer are much less likely to be influences by weather, especially when relative elevation changes are used. Further, the data from the barometer 214 may need to be combined with other data for absolute elevation determinations.

The example mobile device 200 further comprises a short-range wireless communication system 216 coupled to the controller 202 by way of the example internal bus 208. The short-range wireless communication system 216 may take any suitable form and protocol, such as Bluetooth, or any or any of the various WIFI protocols, such as IEEE 802.11. In example embodiments, the mobile device 200 receives data from beacon devices 112 (FIG. 1) as part of providing navigation services to the user of the mobile device 200.

The example mobile device 200 further comprises a cellular communication system 218 electrically coupled to the controller by way of the example internal bus 208. The cellular communication system 218 wirelessly communicates with cell towers to provide voice and data services. In example embodiments, internal maps of indoor venues (such as indoor venue 102 (FIG. 1)) may be downloaded using the data aspects of the cellular communication system 218. The maps may also be downloaded by use of the short-range wireless communication system 216 in addition to, or in place of, the cellular communication system 218.

The example mobile device 200 further comprises a display device 220 electrically coupled to the controller 202 by way of display driver 222. As the name implies, the display driver 222 takes data provided by the controller 202 (e.g., maps, graphical indications of direction to travel) and displays the information on the display device 220 for the user. In some example systems, the display device 220 is covered by or integrated with a touch screen system (not specifically shown). The controller 202 may interface with the touch screen system by way of touch screen interface 224. Thus, using the touch screen system and the touch screen interface 224, the controller 202 may receive information from the user, such as by way of keyboard implemented using the display device 220. In other cases, the mobile device 200 may implement a physical keyboard in addition to, or in place of, the touch screen system and touch screen interface 224.

Finally, the example mobile device 200 comprises a battery 226. The battery 226 provides power to all of the noted internal components, but the electrical connections to the battery 226 are not shown so as not to unduly complicate the drawing. The battery 226 may take any suitable form, such as a lithium-ion battery, but any currently available or after-developed battery technology may be used. Thus, the mobile device 200 may be any currently available mobile device (e.g., APPLE® brand iPhones available from Apple, Inc., or ANDROID® brand devices available from Google, Inc.) or any after-developed hand-held computing device or mobile device. The discussion now turns to a software environment in which the example embodiments are operated, and it will be understood the various pieces of the software that make up the software environment may be executed by the controller 202, and in specific examples stored on the memory 206 and executed by the processor 204.

Figure 3:
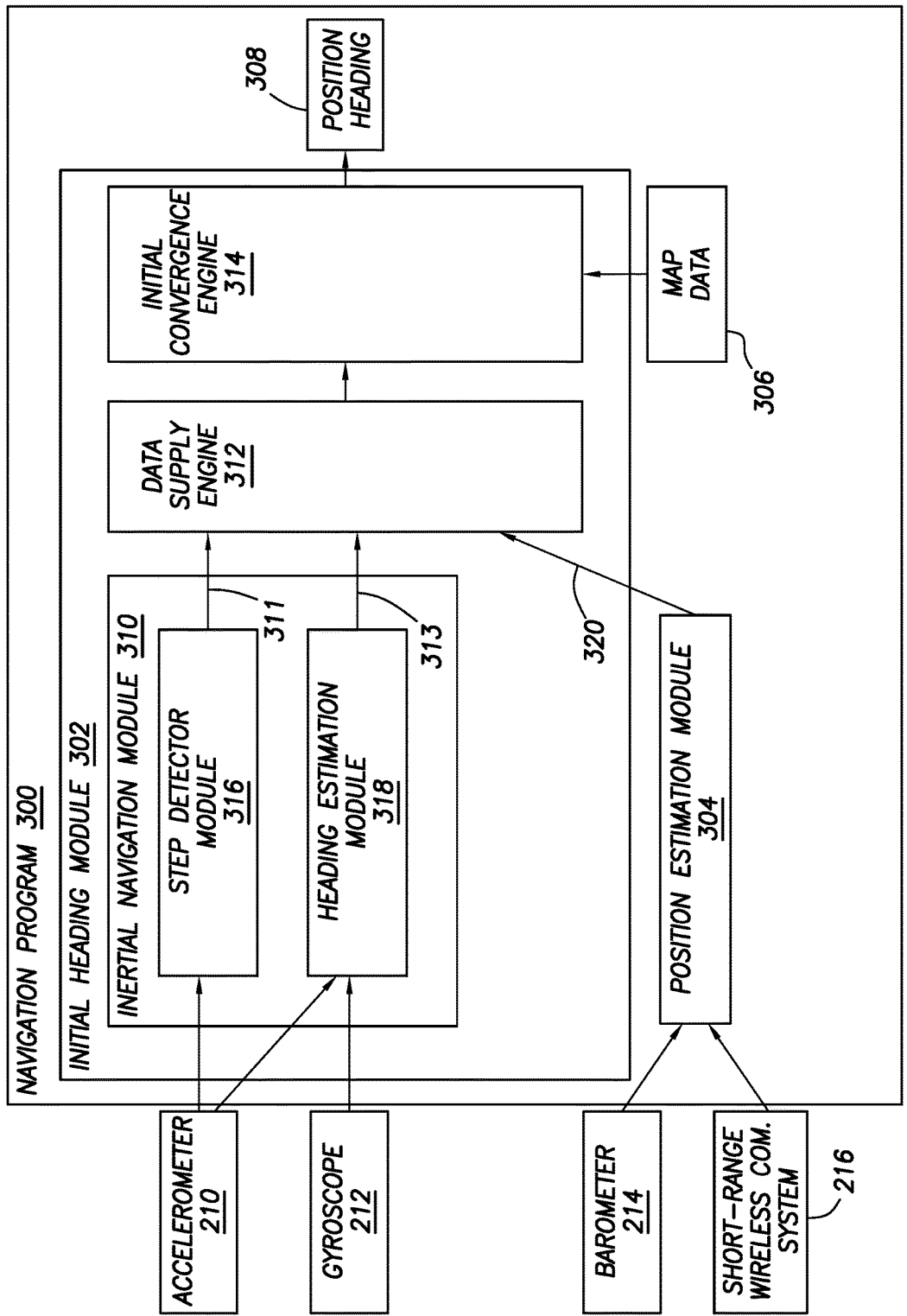
FIG. 3 shows a block diagram of a navigation program in accordance with at least some embodiments.

FIG. 3 shows a block diagram of a navigation program in accordance with at least some embodiments. In particular, FIG. 3 shows that navigation program 300 interfaces with various devices of the mobile device 200 (FIG. 2), such as the accelerometer 210, gyroscope 212, barometer 214, and short-range wireless communication system 216. The navigation program 300 may provide to the user navigation information, such as by placing that navigation information in display device 220 of FIG. 2. The example navigation program 300 is conceptually, though not necessarily physically, divided into a plurality of modules and data engines.

In particular, the example navigation program 300 comprises an initial heading module 302 which, as the name implies, is designed and programmed to determine or estimate the initial heading of the user in startup situations, and as we shall see situations where the user makes abrupt direction changes. The initial heading module 302 reads or takes input from the accelerometer 210 and the gyroscope 212. In cases where the mobile device 200 does not have a gyroscope 212, a magnetometer may be substituted. If a mobile device 200 has both a gyroscope 212 and magnetometer, example embodiments use only the gyroscope 212 to the exclusion of the magnetometer. The initial heading module 302 further receives data indicative of position (hereafter just position data) from other portions of the navigation program 300. In the example environment of FIG. 3, the position data is provided from a position estimation module 304, and in particular the position estimation module 304 periodically (e.g., once every second) provides position data from the initial heading module 302. The initial heading module 302 further receives map data 306 from the navigation program 300, such as map data downloaded through the cellular communication system 218 (FIG. 2) or read through the short-range wireless communication system 216. Finally, the initial heading module 302 outputs or provides position and heading 308 to the navigation program 300, which may be used to provide directions to the user of the mobile device 200.

In example embodiments, the initial heading module 302 is conceptually, though not necessarily physically, divided into a plurality of underlying modules and engines. For example, the initial heading module 302 may comprise an inertial navigation module 310, a data supply engine 312, and an initial convergence engine 314. Each will be addressed in turn, starting with the inertial navigation module 310. The example inertial navigation module 310 takes input from the accelerometer 210 and gyroscope 212, and produces data indicative of speed (hereafter just speed data) of the mobile device 200 (FIG. 2) and thus user, as shown by arrow 311. The inertial navigation module 310 also produces data indicative of heading change (hereafter just heading change data) of the mobile device 200, as shown by arrow 313. That is, the heading change data may include a numerical value that indicates the change in heading that has occurred since the immediately previous last numerical value (e.g., +10 degrees, −20 degrees). Thus, the heading change data is, in some embodiments, not a direct indication of direction; rather, the heading change data merely shows how much heading has changed since the immediately previous heading change data was provided. The inertial navigation module 310 produces updated speed data and heading change data multiple times within a frame period (e.g., a frame period of one second).

For reasons that will become more clear below, the functionality of the inertial navigation module 310 is conceptually divided into a step detector module 316 and a heading estimation module 318. As the names imply, the step detector module 316 determines or calculates speed data based on detecting steps taken by the user of the mobile device 200 (FIG. 2). In some example systems, the step detector module 316 takes into account information about the user and/or the indoor venue 102 (FIG. 1) when calculating stride length as part of generating speed data. Heading estimation module 318 is primarily concerned with creating the heading change data based on data from the accelerometer 210 and gyroscope 212.

Still referring to FIG. 3, the initial heading module 302 again comprises the data supply engine 312. The data supply engine 312 receives as input speed data and heading change data from the step detector module 316 and heading estimation module 318, respectively. The speed data and heading change data may arrive at the data supply engine 312 multiple times within a frame period. For example, if a frame period is one second, the data supply engine 312 may receive ten or more updates of speed data and heading change data within the one second frame period. The data supply engine 312 further receives as input data indicative of actual position (hereafter just actual position) from the navigation program 300, and specifically the position estimation module 304. The data supply engine 312 is designed and programmed to ensure the data makes logical sense before being passed to the initial convergence engine 314.

The internal workings of the initial convergence engine 314 are discussed in greater detail below. Nevertheless, the initial convergence engine 314 receives the speed data, heading change data, and when available updates to the actual position. Moreover, the initial convergence engine 314 receives map data 306. The initial convergence engine spawns a plurality of clone processes, and terminates clone processes whose unique direction fails to sufficiently match the actual direction. The initial convergence engine 314 determines the initial heading of the mobile device 200 (FIG. 2) based on remaining clone processes, and passes the initial heading and position 308 to the navigation program 300.

Position estimation module 304 receives as input barometric pressure data from the barometer 214, as well as location information through the short-range wireless communication system 216, such as location information from beacon devices 112 (FIG. 1). The position estimation module 304 is shown outside the initial heading module 302 to signify that any currently available or after-developed position estimation methodology may be used. In many cases the position estimation module uses a triangulation method and/or a RSSI method to determine location. Each location estimation takes a finite time to perform, and thus in some cases the actual position 320 estimated and supplied to the data supply engine 312 may be provided once every frame period. In some example systems, the frame period is defined by the rate at which the position estimation module 324 can generate updated actual positions, such as once a second.

Still referring to FIG. 3, and returning to the step detector module 316. In accordance with example embodiments, average speed in a time interval is calculated by dividing total displacement of the mobile device 200 by the time interval. Displacement of the mobile device 200 is obtained by processing accelerometer data. When the user of the mobile device 200 walks, periodic variations are detected by accelerometer 210. By performing peak detection, steps are detected in real time. For each detected step, a dynamic calculation formula of step length based on a human's walking features is performed. While any of a variety of models for calculating speed may be used, in example cases the Scarlet Model is used. The Scarlet Model considers variations due to different users, different paces of the same user, and stride lengths of the same user. In the Scarlet Model, the step length is calculated by using the following formula:

$$L_{Scarlet} = k \frac{\frac{\sum_{i=1}^{N}|a_i|}{N} - a_{min}}{a_{max} - a_{min}} \quad (1)$$

where $L_{Scarlet}$ is the calculated step length, N represents the number of acceleration sampling points during a step, $a_i$ is the acceleration in one sampling process, $a_{max}$ and $a_{min}$ are the maximum and minimum value, respectively, of the acceleration in vertical direction during a step, and k is a constant. Using the Scarlet Model each step is converted to step length and hence to displacement of the user and the mobile device. The speed of the mobile device 200 (FIG. 2) may thus be determined by the summation step lengths divided the time period.

The constant k may be determined experimentally by modelling the user's behavior. In accordance with at least some embodiments, accuracy of Scarlet Model is enhanced by determining the constant k for a particular user. That is, the constant k may be personalized and adapted to the user. The mobile device 200 (FIG. 2) learns and adapts k for the person and/or the environment. Further, the more the user deploys the navigation program 300, the better the constant k becomes for the particular user. That is to say, in example systems the initial heading module 310 modifies the stride length, and in particular the constant k, based on data regarding the user or person carrying the mobile device 200.

In accordance with yet still further embodiments, accuracy of the example Scarlet Model is enhanced by modifying the constant k for a particular venue. That is, the user's pace and strides change depending on the venue. For example, some users walk faster at the airports, some users stroll in shopping centers. Thus, in some embodiments the mobile device 200, and more particularly the step detector module 316 may: modify the constant k to modify the stride length based on data regarding a venue within which the user and mobile device are moving; and/or modify the constant k to modify the stride length based on data received from a beacon device 112 (FIG. 1) within the venue. Stated otherwise, in some example systems and methods, changes to the value of the constant k are made depending based on: user dependent data; deployment of data over time; and/or venue and user adapted data.

Still referring to FIG. 3, and specifically the heading estimation module 318. To compute heading change in specific time intervals, readings from both the accelerometer 210 and gyroscope 212 may be made, and those readings fused to compute an attitude (e.g., 3-dimensional orientation) of the mobile device 200 (FIG. 2). The attitude may be then projected onto the ground-tangential plane to extract the two-dimensional heading. The heading change is then computed by determining a difference of the heading values of two consecutive heading values. In at least some embodiments, the fusion is performed using a Kalman filter or a complementary filter. In some mobile devices Kalman filter use less power. A specific filtering method may be selected by the heading estimation module 318 based on an identification of mobile device 200. Optimizing the application for the device reduces power usage significantly. In some systems, to increase accuracy the magnetometer is not used (even if present), as magnetometer readings are affected by environmental factors, such as iron, steel blocks, and computers by power cables. Data from a magnetometer is used only if the mobile device does not have a gyroscope.

Figure 4:
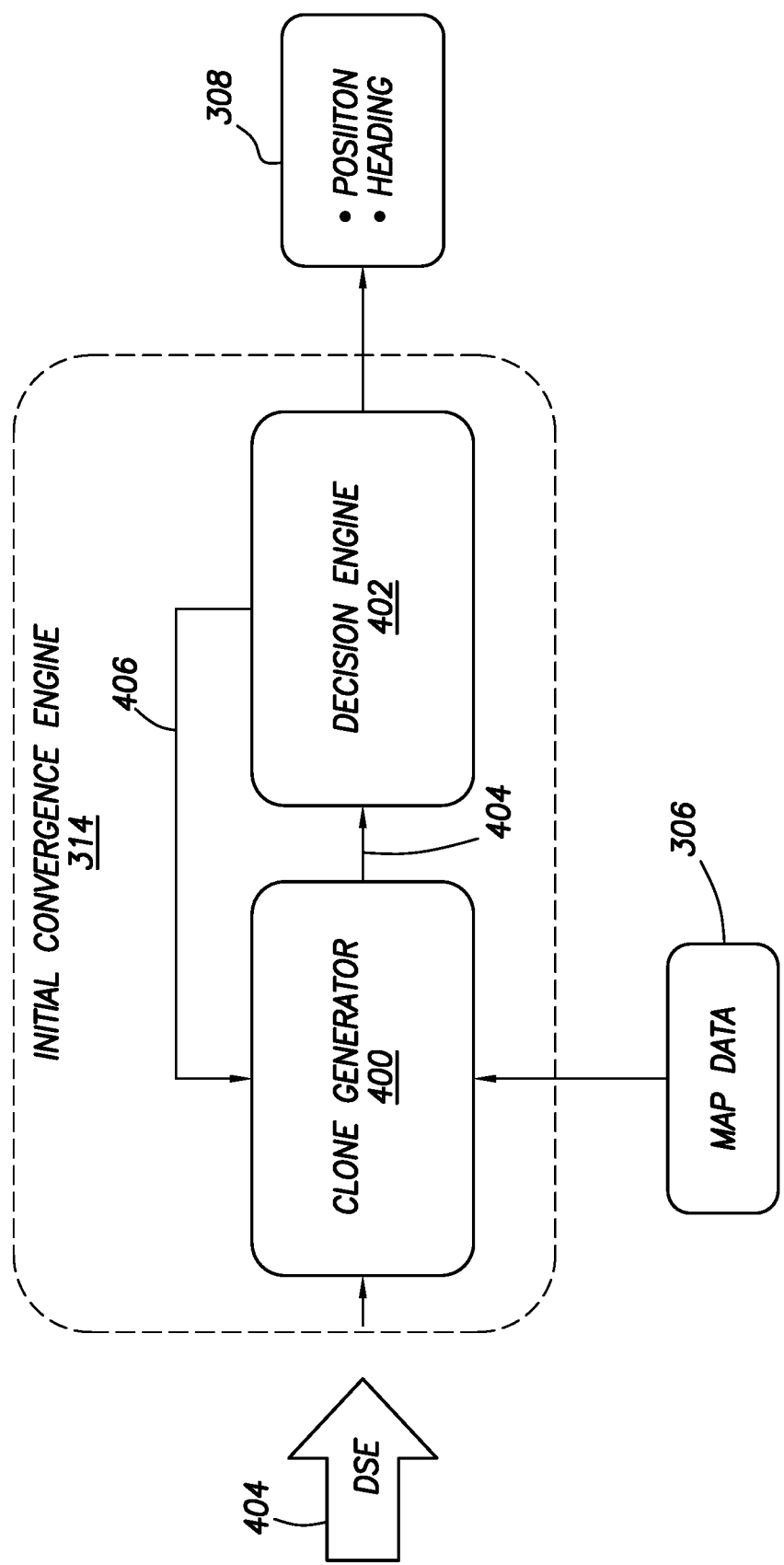
FIG. 4 shows a block diagram of the internal components of the initial convergence engine.

FIG. 4 shows a block diagram of the internal components of the initial convergence engine. In particular, the initial convergence engine 314 may be conceptually, though not necessarily physically, divided into a clone generator 400 and a decision engine 402. As will be discussed in greater detail below, the clone generator 400 receives speed, heading change, and in some cases position from the data supply engine 312 (FIG. 3), and as shown by arrow 404. Moreover, the clone generator 400 receives map data 306 from the navigation program 300. The clone generator 400 spawns clone processes and "distributes" the clone processes across a swath of directions (e.g., covering 360 degrees). Stated differently, each clone processes is given an identical initial location and speed, and each clone process given a unique direction. In some cases, the clone generator 400 refrains from spawning clone processes whose unique directions are toward obstacles, such as walls, pillars and other obstacles. In an open space with no close obstacles, the clone generator 400 may spawn 120 clone processes with unique directions spanning 360 degrees. In many cases, the unique directions of the clone processes may be evenly spread about the about the span of directions. For example, in the case of 120 clone processes spanning 360 degrees, the unique direction of each clone process may be three degrees from the unique direction of its nearest neighbor clone processes. In cases where the initial heading may be partially known (e.g., an abrupt turn by the user), the clone generator 400 may spawn clone processes along a smaller span of headings, such as clone processes spanning a range of headings greater than 90 degrees, but less than 270 degrees, or less than 180 degrees. While the developmental context is spawning clone processes in two dimensions, one having ordinary skill in art, with the benefit of this disclosure, could easily extend the idea of spawning clone processes in three-dimensional space (e.g., aviation context) for higher accuracy.

The decision engine 402 is the authority that makes survival decisions regarding the clone processes, and at the appropriate times makes the determination regarding the initial heading of the mobile device 200 (FIG. 2). Example internal workings of the decision engine 402 are described after a more thorough description of the clone processes and lifespan thereof.

Figure 5:
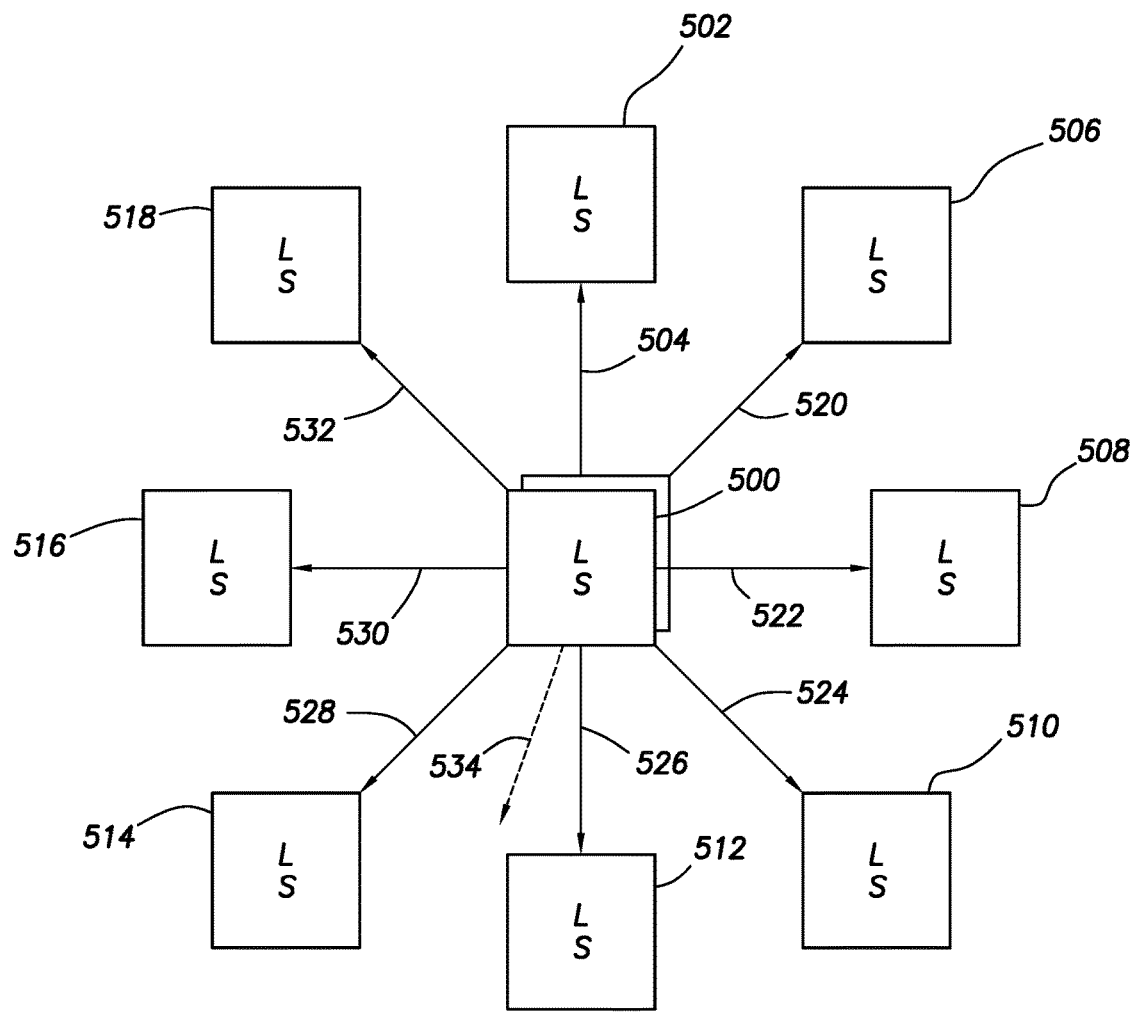
FIG. 5 shows an overhead conceptual view of spawning clone processes in accordance with at least some embodiments.

FIG. 5 shows an overhead conceptual view of spawning clone processes in accordance with at least some embodiments. In particular, FIG. 5 shows spawning or creation process in an example two-dimensional space with no obstacles in the immediate vicinity. Moreover, FIG. 5 shows two distinct points in time, with the center blocks representing location of the clone processes when initially spawned, and the outer ring of blocks a finite time after creation. In example embodiments, when the initial heading module 314 (FIG. 3), and particularly the initial convergence engine 314 (again FIG. 3) is called or executed, the initial convergence engine 314 creates or spawns a plurality of clone processes 500. Each clone process is given an initial identical location L and identical initial speed S, and each clone process given a unique direction. In the conceptual example of FIG. 5, the clone processes 500 at creation are all "located" in the same place in the middle of the figure, and thus not all the clone processes are visible. The "L" and "S" inside the upper most clone process 500 signify the location and speed. The unique direction of each clone process is shown by the radial arrows. That is, in the example of FIG. 5, eight clone processes are created with eight unique directions spanning 360 degrees. FIG. 5 uses eight clone processes so as not to unduly complicate the figure, but in practice for unique directions spanning 360 degrees, 120 clone processes may be used.

The location and speed data is provided to the clone processes 500 from the data supply engine 312 (FIG. 3). Note, however, that while the data supply engine 312 passes along heading change data, the heading change data may be ignored or discarded at the point in the time that the clone processes are created. Rather, each clone processes is assigned a unique direction within a range of headings (again here, spanning 360 degrees).

Each clone process then calculates a respective position at the end of a period of time, such as a frame period. That is, given the initial location and speed data, each clone process calculates a how far the clone process "moves" during the frame period based on the initial location, speed data, and unique direction. For example, clone process 502 calculates a new location (i.e., respective position) a distance along the unique direction 504 given the speed, to arrive at the new location as conceptually shown in FIG. 5. The same process is carried out by all the example clone processes 506, 508, 510, 512, 514, 516, and 518 along their respective unique directions 520, 522, 524, 526, 528, 530, and 532.

Each clone process is a software construct, not an actual device moving the two- or three-dimensional space. In some cases, each clone process may be an entry in a data table, and the table is updated with updated speed data, heading change data, and position. In other cases, such as mobile devices 200 (FIG. 2) having multi-threaded processors, each clone process may be a separately executed thread of the processor communicating through inter-process communication (IPC) calls to the other modules and engines.

Still referring to FIG. 5, each time the data supply engine 312 (FIG. 3) provides updated speed data and heading change data, each clone process utilizes the updated speed data and heading change data to calculate new respective locations. FIG. 5, however, does not show a second location calculation so as not to unduly complicate the drawings. The data supply engine 312 periodically supplies actual location data to the clone processes, for example, once every frame period. That is, speed data and heading change data may be provided more often than actual location. Nevertheless, when a clone process receives actual location data, the clone process calculates one or more metrics that may be used in termination decisions regarding the clone. For example, each clone process may calculate a separation between the respective position and the actual position. In other cases, each clone process may determine a distance or gap between the respective position and a nearby obstacle. Other metrics related to the clone processes being Extended Kalman Filters (discussed more below) may also be calculated.

The example system and method terminates clone processes whose metrics indicate the clone process does not show sufficient correlation to the actual heading. For example, if the separation between the respective position and the actual position is outside a separation threshold, the clone process is terminated. As another example, if the gap between the respective position and an obstacle is less than a gap threshold, the clone process is terminated.

Consider, for purposes of explanation, that the actual heading is between unique heading 526 and 528, such as actual heading 534. The metrics regarding correlation with respect to the actual heading 534 will greater for clone processes whose unique directions are closer to the actual heading 534. Oppositely, the metrics regarding correlation with respect to the actual heading 534 will be less for clone processes whose unique directions are farther or opposite actual heading 534. Thus, some of the example clone processes of FIG. 5 will be terminated, such as clone processes 502, 506, and 518. The process may thus continue for one or more frame periods, each time narrowing the number of clone processes, where the unique directions of the remaining clone processes are indicative of the actual heading 534.

Figure 6:
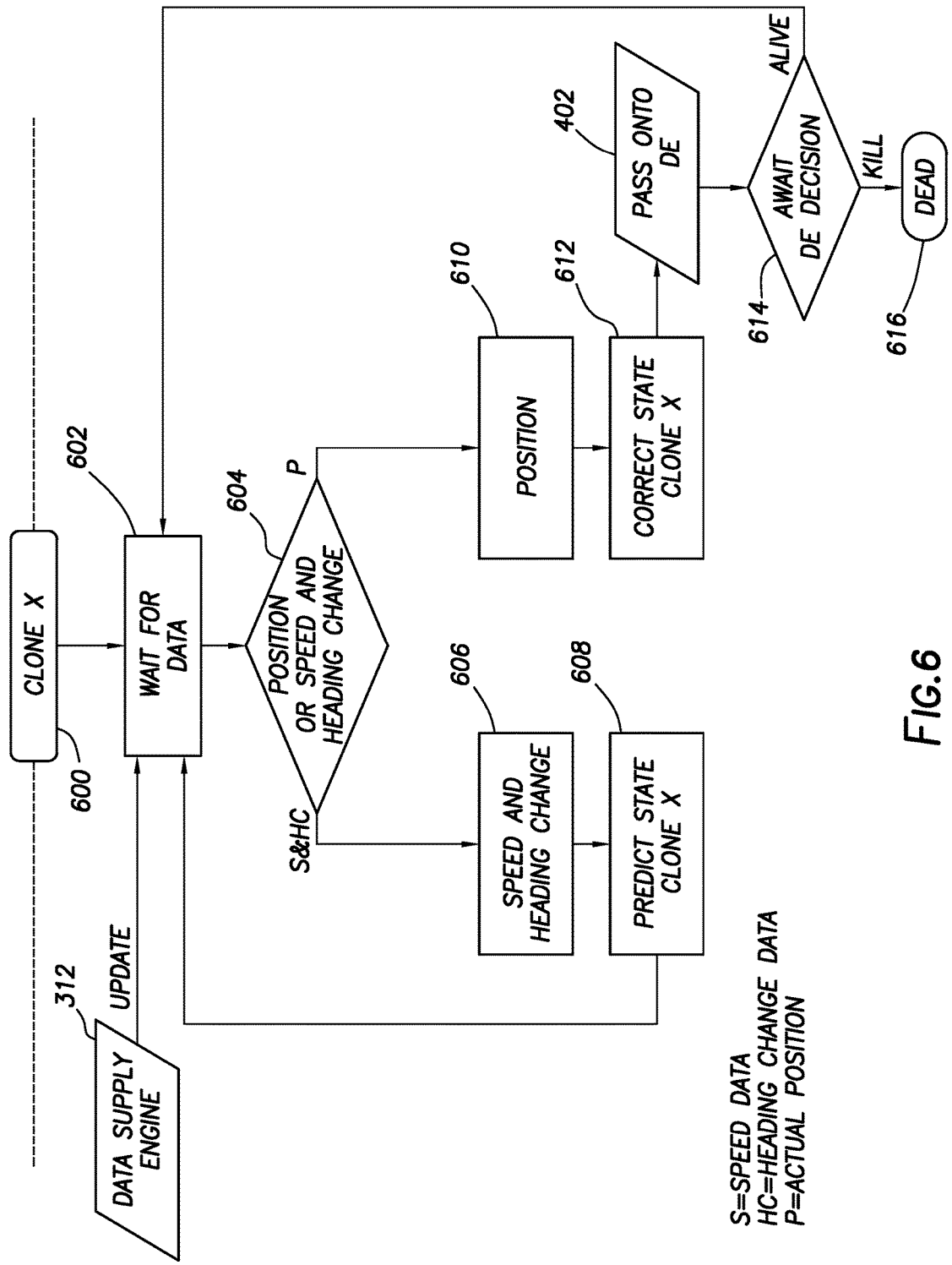
FIG. 6 shows a flow diagram of a single clone process in accordance with at least some embodiments.

FIG. 6 shows a flow diagram of a single clone process in accordance with at least some embodiments. In particular, the clone process X (in the figure "clone x") is created or spawned with an initial speed, initial position, and unique heading (block 600). Thereafter, the example clone process waits for an update from the data supply engine 312 (block 602). When the updated data is received, the example process moves to a determination as to whether the updated data is an update to speed data and heading change data, or the updated data is an actual position (block 604). If the updated data is speed data and heading change data (again block 604), the example process moves to speed & heading change (block 606), where the "location" of the clone process is updated, to arrive at or predict the state of the clone process (block 608). The example process then retreats to the wait for further data.

If the updated data includes an actual position (again block 604), the example process moves to calculating metrics regarding the actual position compared to the respective position of the clone process (block 610), among other possible metrics, such as metrics related to the Extended Kalman Filter process discussed more below. The metrics related to position (block 612) are passed to the decision engine (DE) 402, and the example process waits for a termination decision (block 614). If the decision engine 402 elects to keep the clone process alive (again block 614), the example process returns to waiting for the next set of updated data (again block 602). If the decision engine elects to kill or terminate the clone process (again block 614), the clone process is killed or terminated (block 616), and the process ends.

In some cases a data update may include both speed data, heading change data, and an actual position. In at least some embodiments, when all three data types arrive, the example clone process calculates the updated respective location (block 606), and then calculates the metrics (block 610); however, the flow diagram does not show the simultaneous arrival case so as not to unduly complicate the figure.

In example cases each clone process is an instance of a Kalman Filter, and in certain cases an Extended Kalman Filter. A bit more mathematically then, the state of clone process at time t may be presented by:

$$\hat{x}_{t|t} = \begin{bmatrix} \hat{s}_{t|t}^x \\ \hat{s}_{t|t}^y \\ \hat{\theta}_{t|t} \end{bmatrix} \quad (2)$$

where $\hat{x}_{t|t}$ is updated state estimate of the clone process at time t, where $\hat{s}_{t|t}^x$ is the x-coordinate, $\hat{s}_{t|t}^y$ is the y-coordinate and $\hat{\theta}_{t|t}$ is the heading. Speed and heading change data are represented by $$u_t = \begin{bmatrix} v_t \\ \Delta\theta_t \\ \tau_t \end{bmatrix} \quad (3)$$

where $v_t$ is the speed at time t, $\Delta\theta_t$ is the heading change at time t, and $\tau_t$ is the time passed after last information reception. Beacon position information at time t is represented by $$z_t = \begin{bmatrix} s_t^x \\ s_t^y \end{bmatrix} \quad (4)$$

where $s_t^x$ is the x-coordinate, and $s_t^y$ is the y-coordinate

In the Extended Kalman Filter implemented in at least some embodiments, the state transition and observation matrices are defined by the following Jacobians:

$$F_t = \frac{\partial f}{\partial x}\bigg|_{\hat{x}_{t|t-1}, u_t} = \begin{bmatrix} 1 & 0 & -v_t\tau_t\sin(\hat{\theta}_{t-1|t-1} + \Delta\theta_t) \\ 0 & 1 & v_t\tau_t\cos(\hat{\theta}_{t-1|t-1} + \Delta\theta_t) \\ 0 & 0 & 1 \end{bmatrix} \text{ and} \quad (5)$$

$$H_t = \frac{\partial h}{\partial x}\bigg|_{\hat{x}_{t|t-1}} = \begin{bmatrix} 1 & 0 & 0 \\ 0 & 1 & 0 \end{bmatrix} \quad (6)$$

where $F_t$ is the state transition model, and $H_t$ is the observation model.

In example cases, when speed and heading change data are received from the data supply engine 312, the state of a clone process is updated using the prediction procedure of the Extended Kalman Filter $$\hat{x}_{t|t-1} = f(\hat{x}_{t-1|t-1}, u_t) \quad (7)$$

$$P_{t|t-1} = F_t P_{t-1|t-1} F_t^T Q_t \quad (8)$$

where $\hat{x}_{t|t-1}$ is the predicted state estimate across the transition from time t−1 to time t, $P_{t|t-1}$ is the predicted covariance estimate, $Q_t$ is process noise covariance matrix (i.e., the potential error in the speed and heading change data combined with the prediction process), and f is the state prediction function that transitions the clone process state with the given speed and heading change input $u_t$ $$f(\hat{x}_{t-1|t-1}, u_t) = \hat{x}_{t-1|t-1} + \begin{bmatrix} v_t\tau_t\cos(\hat{\theta}_{t-1|t-1} + \Delta\theta_t) \\ v_t\tau_t\sin(\hat{\theta}_{t-1|t-1} + \Delta\theta_t) \\ \Delta\theta_t \end{bmatrix} \quad (9)$$

Actual position information could be received from BLE beacons or any other transmitter transmitting location information, such as UWB transmitters or any other type. Actual position information may be calculated using different techniques such as triangulation and/or signal strength measurements. In example embodiments, position estimation module 304 calculates and provides the actual position information, and supplies the actual position 320 (FIG. 3) to data supply engine 312 (FIG. 3) for boundary checks and verification. "Internal Position" is then determined by fusing sensor supplied data and map information. Internal Position is inherently and significantly more accurate than externally supplied position information.

The state of a clone process is updated by using and update procedure of Extended Kalman Filter:

$$\tilde{y}_t = z_t - h(\hat{x}_{t|t-1}) \quad (10)$$

$$S_t = H_t P_{t|t-1} H_t^T + R_t \quad (11)$$

$$K_t = P_{t|t-1} H_t^T S_t^{-1} \quad (12)$$

$$\hat{x}_{t|t} = \hat{x}_{t|t-1} + K_t \tilde{y}_t \quad (13)$$

$$P_{t|t} = (I - K_t H_t) P_{t|t-1} \quad (14)$$

where $\tilde{y}_t$ is the measurement residual, $S_t$ is the residual covariance, $K_t$ is the near-optimal Kalman gain, $\hat{x}_{t|t}$ is updated state estimate, $P_{t|t}$ is the updated covariance estimate, $R_t$ is the measurement noise covariance matrix (i.e., the potential error in the beacon position information) and $h(\hat{x}_{t|t-1})$ is the function that adapts the clone process state vector to the beacon position information vector $z_t$ $$h(\hat{x}_{t|t-1}) = H_t \hat{x}_{t|t-1}. \tag{15}$$

After the state of a clone process is updated upon reception of a beacon position information, state of the clone process is passed to the decision engine (block 402, FIG. 4) for the evaluation of the survival of the clone process in the next time frame. The specification now turns to a description of the the decision engine 402 regarding clone process termination decisions as well as determining the heading of mobile device 200 (FIG. 2) from remaining clone processes.

Returning briefly to FIG. 4, the decision engine 402 receives state information from the clone processes (as shown by arrow 404). Using the state information, the decision engine makes decisions, and conveys the decisions back to the clone processes (as shown by arrow 406). The decision engine 402 in example embodiments has two functions: making kill or termination decisions regarding each clone process using the state information; and determining whether the remaining clone processes are converging, and if so calculating a heading from the remaining clone processes. Starting with the kill or termination decisions, and as alluded to above, in example cases the decision engine 402 kills or terminates a clone process if the distance between the clone process and the latest actual position identified position estimation module 304 is greater than a threshold, and in some cases threshold is optimized and pre-determined for a venue. Stated otherwise, the decision engine terminates each clone process whose separation between its respective position and the actual position is greater than the predetermined threshold being a separation threshold. The example decision engine 402 also kills or terminates a clone process if the clone process is getting too close to a wall or any obstacle identified by map data 306. 'Close' is pre-determined for a venue. Stated otherwise, the decision engine 402 kills or terminates each clone process whose gap between its respective position and an obstacle is less than the predetermined threshold being a gap threshold.

Figure 7:
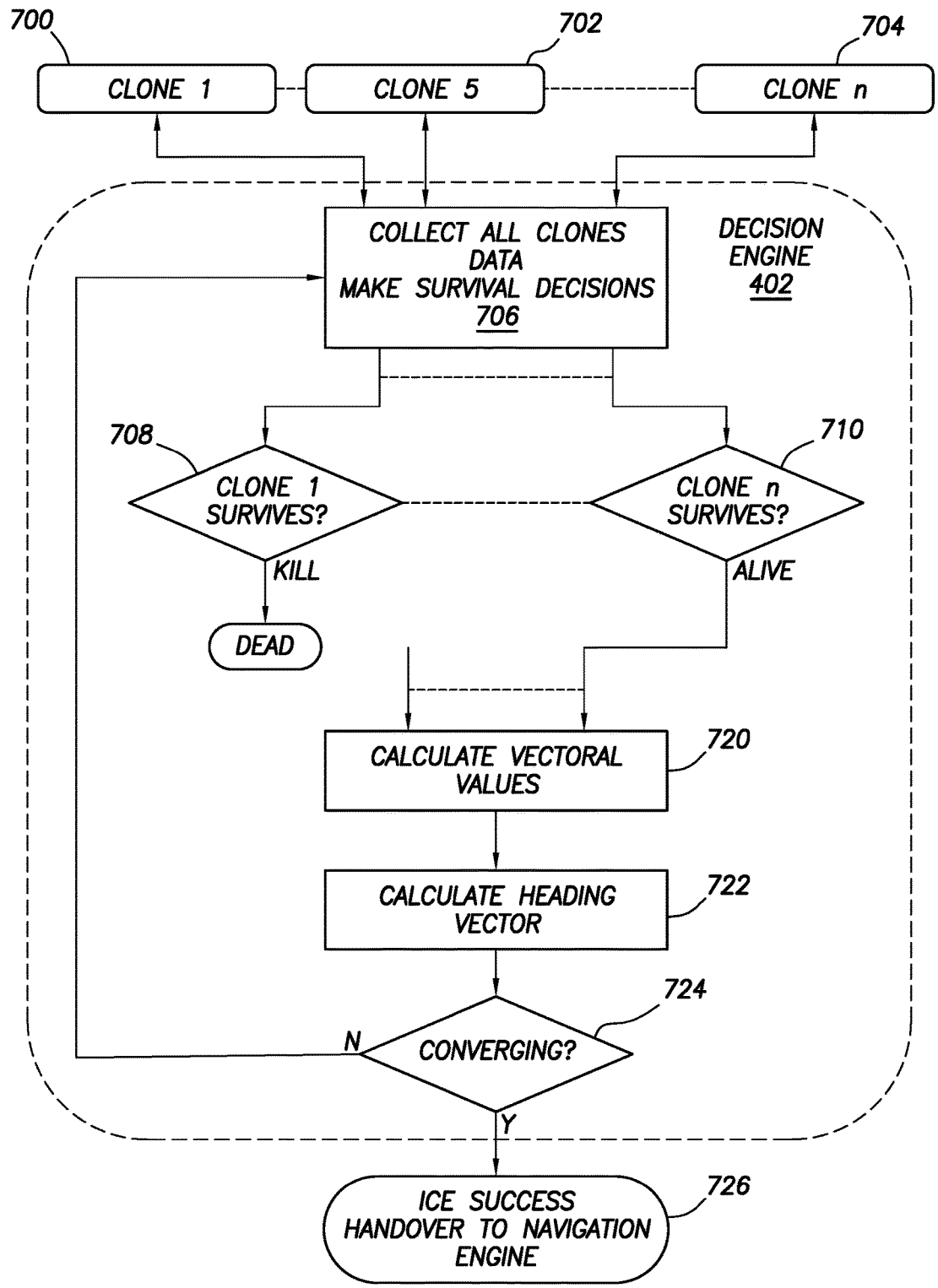
FIG. 7 shows a flow diagram of the process of the decision engine in accordance with at least some embodiments.

FIG. 7 shows a flow diagram of the process of the decision engine in accordance with at least some embodiments. In particular, shown across the top of the figure are a plurality of clone processes 700, 702, and 704. When the clone processes are initially spawned, all the clone processes communicate with the decision engine 402 (see arrow 406 of FIG. 4). As the clone processes are terminated during the determination of initial heading, fewer and fewer remain to communicate with the decision engine 402. The decision engine 402 collects all the state data from the clone processes (block 706), and makes kill or termination decisions using the data (again block 706). For each clone process still "alive", a decision is then made whether to kill or terminate each clone process. FIG. 7 shows two example decision blocks 708 and 710 making kill or termination decisions, but there would be a decision block for each clone process and/or each remaining clone process. With the data of the remaining clone processes, a calculation of vectoral values is made (block 720), followed by a calculation of a heading vector (block 722). From there, a decision is made as to whether the direction suggested by the remaining clones is converging (block 724). If not, the process retreats to the collection of clone data (block 706). If convergence has occurred (again block 724), the initial convergence engine has successfully determined the initial heading, and handover is made to the navigation engine or navigation program (block 726). The specification turns to a visual representation of determining whether convergence on a heading has taken place.

Figure 8:
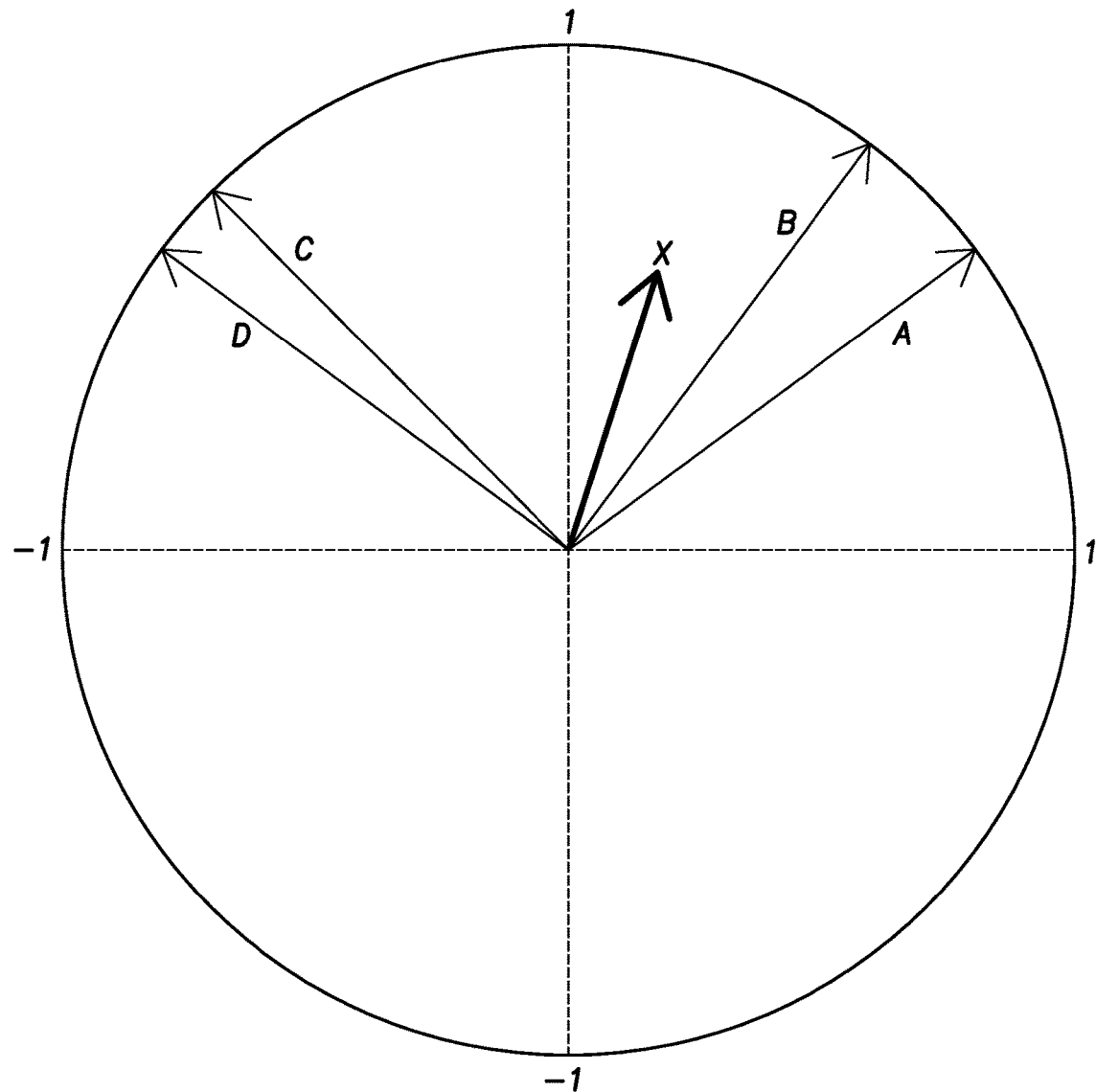
FIG. 8 shows a unit circle in order to describe convergence determinations, in accordance with at least some embodiments.

FIG. 8 shows a unit circle in order to describe convergence determinations, in accordance with at least some embodiments. In particular, FIG. 8 assumes that four clone processes remain, being clone processes A, B, C, and D. Each clone process has a unique heading, which may be either the original unique heading, or headings modified by one or more sets of heading change data. Since all the clone processes are provided the heading change data, the relative relationship between the unique headings remain unchanged. The headings are implied by the arrows indicated each clone process in FIG. 8. Moreover, since all the clone processes are provided the same initial speed, and the same sets of speed data, the vector displacement of each clone process from the initial location will be the same, and thus for purposes of convergence determinations the vectors may be considered to be unit vectors of length one as shown. Calculated displacements from the initial location could also be used.

In accordance with example embodiments, to determine whether convergence has occurred, the decision engine 402 (FIG. 4) calculates an average vector using the unique heading from each of the remaining clone processes. An example average vector is shown in FIG. 8 as vector X. If a magnitude of the average vector X meets or exceeds a magnitude threshold, then the decision engine 402 assumes that convergence has taken place. The heading of the average vector X is then assigned to be the initial heading of the mobile device 200 (FIG. 2) and is provided to the navigation program 300 (FIG. 3). In example cases using unit vector length for the clone processes, the magnitude threshold may be 0.8, but the magnitude threshold may be modified taking into account properties of the venue, such as wall structures and number of beacon devices per square yard.

On the other hand, if the magnitude of the average vector X is below the magnitude threshold, the example process returns to the remaining clone processes calculating new positions based on updated speed data and heading change data, and terminating clone processes, until convergence is achieved.

More mathematically now, for purposes of determining whether convergence has taking place, heading information of surviving or remaining clone processes is used. For each remaining clone process indexed by i (where $1 \leq i \leq n$, and n is the number of remaining clone processes) heading of the average vector is calculated by using its heading $\theta i$ as $\vec{h} = (\cos \theta i, \sin \theta i)$. Then the average heading vector $\underline{h}_{avg} = (x_{avg}, y_{avg})$ is calculated as:

$$x_{avg} = 1/n \Sigma_{i=1}^{n} \cos \theta_i \text{ and} \tag{16}$$

$$y_{avg} = 1/n \Sigma_{i=1}^{n} \sin \theta_i \tag{17}$$

The magnitude of the average heading vector $m_{avg} = |\vec{h}_{avg}|$ is a number between [0,1] which is calculated as:

$$m_{avg} = \sqrt{x_{avg}^2 + y_{avg}^2} \tag{18}$$

where the variables are as defined above. If $m_{avg}$ is greater than the convergence threshold, the decision engine 402

(FIG. 4) informs initial convergence engine 314 (FIG. 4) about the convergence. If true, the initial convergence engine 314 then calculates estimated position P=(x,y) and heading θ=a tan 2($x_{avg}$,$y_{avg}$) by using the following formulas:

$$x = 1/n \Sigma_{i=1}^{n} x_i, \quad (19)$$

$$y = 1/n \Sigma_{i=1}^{n} y_i, \text{ and} \quad (20)$$

$$a\tan2(x, y) = \begin{cases} \arctan\left(\frac{y}{x}\right) & \text{if } x > 0 \\ \arctan\left(\frac{y}{x}\right) + \pi & \text{if } x > 0 \text{ and } y \geq 0 \\ \arctan\left(\frac{y}{x}\right) - \pi & \text{if } x > 0 \text{ and } y < 0 \\ \frac{\pi}{2} & \text{if } x = 0 \text{ and } y > 0 \\ -\frac{\pi}{2} & \text{if } x = 0 \text{ and } y < 0 \\ \text{undefined} & \text{if } x = 0 \text{ and } y = 0 \end{cases} \quad (21)$$

Thus again, if the magnitude of the average vector X meets or exceeds the magnitude threshold, then the decision engine 402 assumes that convergence has taken place. And if the magnitude of the average vector X is below the magnitude threshold, the example process returns to the remaining clone processes calculating new positions based on updated speed data and heading change data, and terminating clone processes, until convergence is achieved.

If the number of clone processes falls below a certain threshold before convergence is achieved, the initial convergence engine 314 (FIG. 4) starts anew spawns a sufficient number of clone processes. A similar scenario could take place when the user suddenly turns (e.g., a turn 180 degrees) and starts walking in the opposite direction.

A few final thoughts to consider. The example methods and mobile device implementing the example methods need not have network access to operate (particularly if the map data is provided by a beacon device within the venue). Relatedly, the example methods and mobile device implementing the example methods need not be in communication with a central server system or otherwise to make the initial heading determination. In the most basic case, the systems and methods need only receive location information from beacon device or beacon-like devices (e.g., GPS satellite data).

In yet more advanced embodiments, the navigation program 300, as part of operating within the venue, gathers information about the venue over time and statistically analyzes user behavior. For example, if a hallway is not used very often, then it is less likely that user should turn into that hallway. The example systems and methods can reduce the number of clones spawned that way (e.g, the unused hallway of feature would be considered an obstacle). This feature is innovative and improves on actual map data. It may be that the hallway is dark, that is why it is not used often. In cases where the example mobile device does not have internet access (e.g., cellular or Wifi) within the venue, the navigation program 300 may save the data, and transmit to a central server at a later point in time, as again connection to a central server is not needed for the initial heading determinations of the various embodiments.

Figure 9:
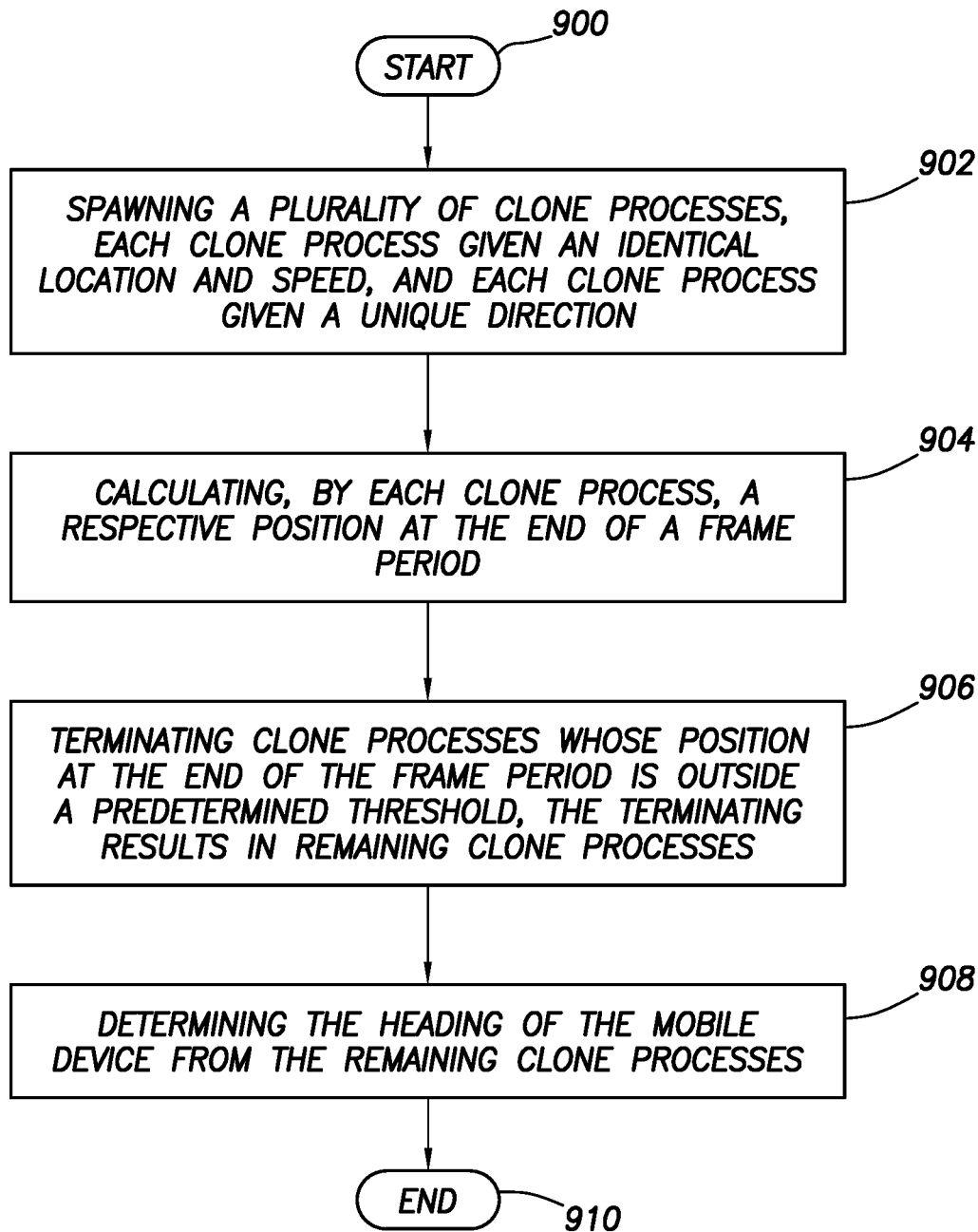
FIG. 9 shows a method in accordance with at least some embodiments.

FIG. 9 shows a method in accordance with at least some embodiments. In particular, the method starts (block 900) and comprises: spawning a plurality of clone processes, each clone process given an identical location and speed, and each clone process given a unique direction (block 902); calculating, by each clone process, a respective position at the end of a frame period (block 904); terminating clone processes whose position at the end of the frame period is outside a predetermined threshold, the terminating results in remaining clone processes (block 906); and determining the heading of the mobile device from the remaining clone processes (block 908). Thereafter the method ends (block 910).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method of determining a heading of a mobile device, comprising:
   spawning a plurality of clone processes, each clone process of the plurality of clone processes being an Extended Kalman filter, each clone process given an identical location and speed, and each clone process given a unique direction;
   calculating, by each clone process, a respective position at the end of a frame period;
   terminating clone processes whose position at the end of the frame period is outside a predetermined threshold, the terminating results in remaining clone processes; and
   determining the heading of the mobile device from the remaining clone processes.

2. The computer-implemented method of claim 1 wherein spawning the plurality of clone processes further comprises spawning the plurality of clone processes such that the unique directions span a range of headings greater than 90 degrees.

3. The computer-implemented method of claim 2 wherein spawning the plurality of clone processes further comprises spawning such that the unique directions are evenly spaced within the range of headings.

4. The computer-implemented method of claim 2 wherein spawning the plurality of clone processes further comprises refraining from spawning clone processes with unique directions heading toward one or more obstacles.

5. The computer-implemented method of claim 1 wherein spawning the plurality of clone processes further comprises spawning the plurality of clone processes such that the unique directions span 360 degrees.

6. The computer-implemented method of claim 1 wherein calculating, by each clone process, the respective position further comprises, a plurality of times during each frame period:
   receiving, by each clone process, updated speed and a value indicative of change of direction; and
   calculating, by each clone process, the respective position using the updated speed and the value indicative of change of direction.

7. The computer-implemented method of claim 1 wherein terminating clone processes further comprises, for each clone process:
   receiving an actual position, and calculating a separation between the respective position and the actual position; and
   terminating each clone process whose separation is greater than the predetermined threshold being a separation threshold.

8. The computer-implemented method of claim 1 wherein terminating clone processes further comprises, for each clone process:
    determining a gap between the respective position and an obstacle; and
    terminating each clone process whose gap is less than the predetermined threshold being a gap threshold.

9. The computer-implemented method of claim 1 wherein determining the heading of the mobile device further comprises:
    calculating an average vector using the unique direction from each of the remaining clone processes; and
    using a heading of the average vector as the heading of the mobile device.

10. The computer-implemented method of claim 1 further comprising, prior to determining the heading:
    calculating an average vector using the unique direction from each of the remaining clone processes; and
    repeating the calculating and terminating until an attribute of the average vector meets or exceeds a convergence threshold.

11. The computer-implemented method of claim 10 wherein repeating the calculating and terminating further comprises repeating the calculating and terminating until a magnitude of the average vector meets or exceeds a magnitude threshold.

12. The computer-implemented method of claim 1 further comprising, prior to spawning the clone processes:
    reading an accelerometer of the mobile device, the reading creates accelerometer data;
    estimating a stride length of a person carrying the mobile device using the accelerometer data;
    determining the speed based on the stride length.

13. The computer-implemented method of claim 12 further comprising at least one selected from a group comprising: modifying the stride length based on data regarding the person carrying the mobile device; modifying the stride length based on data regarding a venue within which the person and mobile device are moving; modifying the stride length based on data received from a beacon device within the venue.

14. A hand-held computing device comprising:
    a processor;
    a memory coupled to the processor;
    a display device electrically coupled to the processor;
    an accelerometer electrically coupled to the processor;
    a wireless communication system electrically coupled to the processor, the wireless communication system configured to receive location information wirelessly from beacons external to the hand-held computing device;
    wherein the memory stores a program that, when executed by the processor, causes the processor to:
        spawn a plurality of clone processes, each clone process of the plurality of clone processes being a Kalman filter, each clone process given an identical location and speed, and each clone process given a unique direction;
        calculate, by each clone process, a respective position at the end of a frame period;
        terminate clone processes whose position at the end of the frame period is outside a predetermined threshold, the terminating results in remaining clone processes; and
        determine the heading of the mobile device from the remaining clone processes;
        provide an indication of direction to travel to a user of the hand-held device by way of the display device.

15. The hand-held computing device of claim 14 wherein when the processor spawns the plurality of clone processes, the program causes the processor to spawn the plurality of clone processes such that the unique directions span a range of headings greater than 90 degrees.

16. The hand-held computing device of claim 15 wherein when the processor spawns the plurality of clone processes, the program causes the processor to spawn such that the unique directions are evenly spaced within the range of headings.

17. The hand-held computing device of claim 15 wherein when the processor spawns the plurality of clone processes, the program causes the processor to refrain from spawning clone processes with unique directions heading toward one or more obstacles.

18. The hand-held computing device of claim 14 wherein when the processor spawns the plurality of clone processes, the program causes the processor to spawn the plurality of clone processes such that the unique directions span 360 degrees.

19. The hand-held computing device of claim 14 wherein when the processor calculates, for y each clone process, the respective position the program further causes the processor to, a plurality of times during each frame period:
    calculate updated speed and a value indicative of change of direction; and
    calculate, for each clone process, the respective position using the updated speed and the value indicative of change of direction.

20. The hand-held computing device of claim 14 wherein when the processor terminates clone processes, the program further causes the processor to:
    determine an actual position using the wireless communication system;
    calculate, for each clone process, a separation between the respective position and the actual position; and
    terminate each clone process whose separation is greater than the predetermined threshold being a separation threshold.

21. The hand-held computing device of claim 14 wherein the processor terminates the clone processes, the program further causes the processor to, for each clone process:
    determine a gap between the respective position and an obstacle; and
    terminate each clone process whose gap is less than the predetermined threshold being a gap threshold.

22. The hand-held computing device of claim 14 wherein when the processor determines the heading of the mobile device, the program further causes the processor to:
    calculate an average vector using the unique heading from each of the remaining clone processes; and
    use a heading of the average vector as the heading of the hand-held computing device.

23. The hand-held computing device of claim 14 wherein the program further causes the processor to, prior to the determination of the heading:
    calculate an average vector using the unique heading from each of the remaining clone processes; and
    repeat the calculation of the respective positions and the termination until an attribute of the average vector meets or exceeds convergence threshold.

24. The hand-held computing device of claim 14 wherein prior to when the processor spawns the clone processes, the program further causes the processor to:
    read the accelerometer, the reading creates accelerometer data;

estimate a stride length of a person carrying the hand-held computing device using the accelerometer data; and
determining the speed based on the stride length.

25. The hand-held computing device of claim 24 wherein the program further causes the processor to at least one selected from a group comprising: modify the stride length based on data regarding the person carrying the hand-held computing device; modify the stride length based on data regarding a venue within which the person and hand-held computing device are moving; and modify the stride length based on data received from a beacon device within the venue.

* * * * *